Dec. 14, 1948.                J. NAAB                2,456,529
                          SEALING DEVICE
                      Filed Oct. 20, 1945

INVENTOR
Julius Naab
BY
HIS ATTORNEY.

Patented Dec. 14, 1948

2,456,529

UNITED STATES PATENT OFFICE 2,456,529

SEALING DEVICE

Julius Naab, Easton, Pa., assignor to Ingersoll-Rand Company, New York, N. Y., a corporation of New Jersey Application October 20, 1945, Serial No. 623,579

1 Claim. (Cl. 309—43)

This invention relates to sealing devices, and more particularly to a sealing device for reciprocatory pistons.

One object of the invention is to assure an effective seal between a piston and the cylinder containing it.

Another object is to prevent the leakage of fluid medium through the sealing-ring grooves in the piston.

A further object is to assure uniform pressure against the sealing ring for maintaining it in sealing relation with the wall of the piston chamber.

Other objects will be in part obvious and in part pointed out hereinafter.

Figure 1:
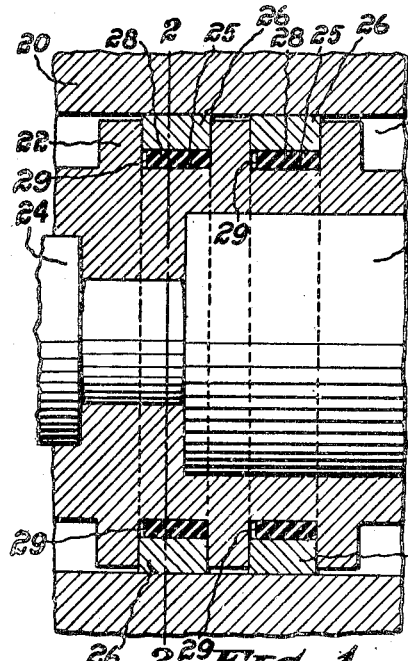
Figure 2:
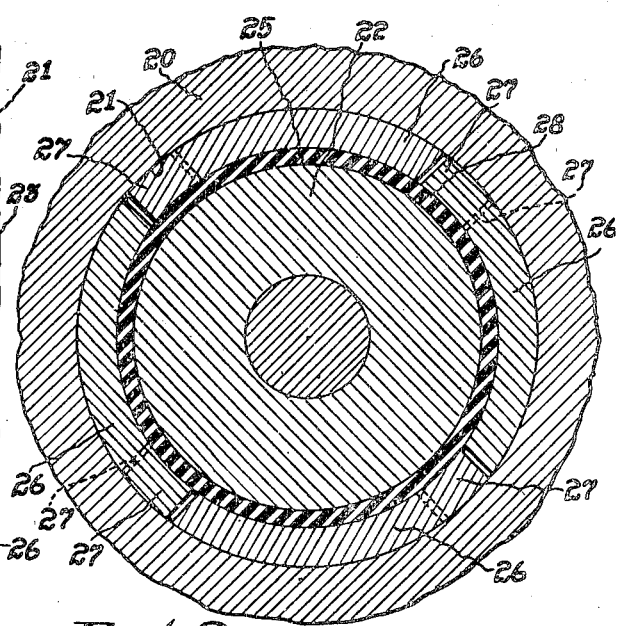
Figure 3:
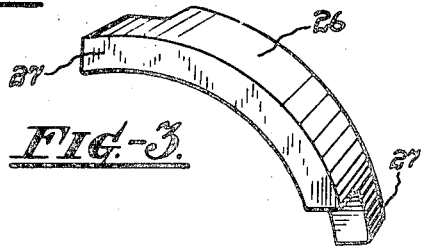
Figure 4:
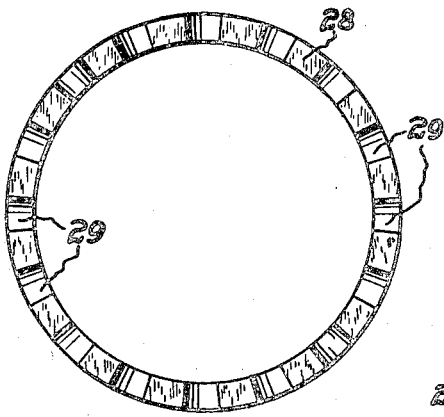
Figure 5:
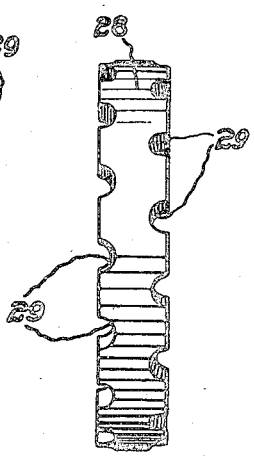

In the drawings accompanying this specification and in which similar reference numerals refer to similar parts, Figure 1 is a longitudinal view, partly broken away, of a portion of a cylinder and a piston therein equipped with a sealing device constructed in accordance with the practice of the invention, Figure 2 is a transverse view taken through Figure 1 on the line 2—2, Figure 3 is a perspective view of a sealing segment, Figure 4 is an end view of a rubber expander ring serving to press the sealing segment into engagement with the wall of the cylinder, and Figure 5 is a side view of the expander ring.

Referring more particularly to the drawings, 20 designates a cylinder having a piston chamber 21, and 22 is a piston reciprocable in the piston chamber.

The piston 22 is of sufficiently smaller diameter than the piston chamber to avoid contact between the two and is held coaxially in the piston chamber by the piston rod 23 and a tail rod 24.

In the periphery of the piston are the usual annular grooves 25, two being shown, for the accommodation of sealing means shown as being in the form of a plurality of segments 26 which are constructed to conform with the wall of the piston chamber 21 wherewith they cooperate. The segments preferably consist of graphitic carbon and are provided at their ends with wings 27 which overlap each other in the assembled positions of the segments in a groove 25.

The segments are of less depth than the groove 25 and, in accordance with the practice of the invention, are urged outwardly into sealing engagement with the wall of the piston chamber 21 by an expander 28 in the form of a rubber band, preferably of ring shape. The expander is of slightly smaller diameter than the bottom of the groove 25 so that it will be tensed when positioned therein and will adhere firmly to the piston. Its thickness is, moreover, initially greater than the space between the segments 26 and the bottom of the groove so that sufficient displacement of rubber will be effected by the segments, when in engagement with the wall of the piston chamber, to assure the force necessary to hold the segments in sealing engagement with the cylinder.

In order to permit the rubber of the expander to be thus displaced, said expander may be of less width than the groove 25 to enable the rubber to flow endwise or, the expander may, as shown, be provided with notches 29 arranged in staggered relation in its opposed edges. In the latter case the expander may have an overall length substantially equal to the width of the groove 25, and the rubber displaced by the segments will then flow in the direction of the notches 29.

In the assembled positions of the parts and when the piston assembly lies in the piston chamber the inner surfaces of the segments 26 are in full and firm engagement with the outer surface of the expander to form a fluid tight seal, and the expander grips the piston with sufficient firmness to prevent the leakage of fluid medium along the bottom of the groove 25. By reason of this arrangement, there can be no leakage of fluid through the groove and the segments may, therefore, be proportioned to have free movement, radially, in the groove.

In practice, when the piston 22, together with the expander 28 and the segments 26, are placed in the piston chamber 21 the pressure of the segments upon the expander will cause the displacement of rubber into the notches 29. The expander will then be conditioned to press the segments outwardly and maintain them in sealing relation with the wall of the piston chamber and to preclude leakage of fluid through the groove 25.

I claim:

In a sealing device, a body having an annular groove in its periphery, sealing means in the groove consisting of a plurality of segments, a rubber ring in the groove to urge the segments radially outward and being in sealing engagement with the bottom of the groove and with the inner surfaces of the segments, and recesses arranged in staggered relation in the opposed edges of the rubber ring to permit the flow thereinto of rubber displaced by the segments.

JULIUS NAAB.

(References on following page)

REFERENCES CITED

The following references are of record in the file of this patent:

UNITED STATES PATENTS

| Number | Name | Date |
|---|---|---|
| 120,565 | Blake | Nov. 7, 1871 |
| 788,769 | Harsen | May 2, 1905 |
| 1,239,726 | Sauer et al. | Sept. 11, 1917 |
| 1,385,508 | Trembley | July 26, 1921 |
| 1,574,926 | Norton | Mar. 2, 1926 |
| 2,134,584 | Sauzedde | Oct. 25, 1938 |
| 2,208,620 | Baisch | July 23, 1940 |
| 2,298,584 | Onions | Oct. 13, 1942 |